United States Patent
Wang

(10) Patent No.: US 8,436,973 B2
(45) Date of Patent: May 7, 2013

(54) LCD DEVICE AND DISPLAY PANEL OF THE DEVICE

(75) Inventor: Chung-Kai Wang, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 228 days.

(21) Appl. No.: 12/951,082

(22) Filed: Nov. 22, 2010

(65) Prior Publication Data

US 2011/0122331 A1    May 26, 2011

(30) Foreign Application Priority Data

Nov. 23, 2009   (TW) ................................. 98139676 A

(51) Int. Cl.
*G02F 1/1345* (2006.01)
(52) U.S. Cl.
USPC .......................................... 349/150; 349/158
(58) Field of Classification Search .................. 349/150, 349/151, 65, 158, 59, 42
See application file for complete search history.

(56) References Cited

U.S. PATENT DOCUMENTS

| 6,411,359 | B1 | 6/2002 | Kobayashi et al. | |
|---|---|---|---|---|
| 2008/0296048 | A1 | 12/2008 | Muro et al. | |
| 2009/0040415 | A1 | 2/2009 | Kim | |
| 2009/0284946 | A1 * | 11/2009 | Yang et al. | 361/818 |

FOREIGN PATENT DOCUMENTS

| CN | 101321431 A | 12/2008 |
|---|---|---|
| JP | 2001264751 A | 9/2001 |
| TW | 200510856 A | 3/2005 |
| TW | I229577 | 3/2005 |
| TW | I266127 | 11/2006 |

* cited by examiner

*Primary Examiner* — Thoi Duong
(74) *Attorney, Agent, or Firm* — Li & Cai Intellectual Property (USA) Office

(57) ABSTRACT

A liquid crystal display device includes a liquid crystal display panel and a flexible printed circuit board electrically connected to the liquid crystal display panel. The liquid crystal display panel includes a first substrate and a controller disposed on the first substrate. The controller is accommodated in a space between the first substrate and the flexible printed circuit board, and is covered by the flexible printed circuit board.

20 Claims, 6 Drawing Sheets

LCD DEVICE AND DISPLAY PANEL OF THE DEVICE

BACKGROUND

1. Technical Field

The present disclosure relates to display technology, and more particularly to a liquid crystal display (LCD) device and a panel of the LCD device.

2. Description of Related Art

LCD devices are commonly used because of their good image quality and minimal profile. An LCD panel is a main component of an LCD device, and is for displaying images according to received signals. A typical LCD panel includes a first substrate, a second substrate and a liquid crystal layer sandwiched between the first substrate and the second substrate. A controller may be mounted on the second substrate via chip on glass (COG) technology, and is for controlling pixel voltages at the liquid crystal layer to generate a desired luminous flux of the LCD panel.

The high signal-transmitting speeds of the controller can emit electromagnetic radiation. The electromagnetic radiation may damage the surrounding elements and disrupt operation of the LCD panel.

What is needed, therefore, is an LCD device that can overcome the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present LCD panel. In the drawings, like reference numerals designate corresponding parts throughout the various views, and all the views are schematic.

DETAILED DESCRIPTION

Figure 1:
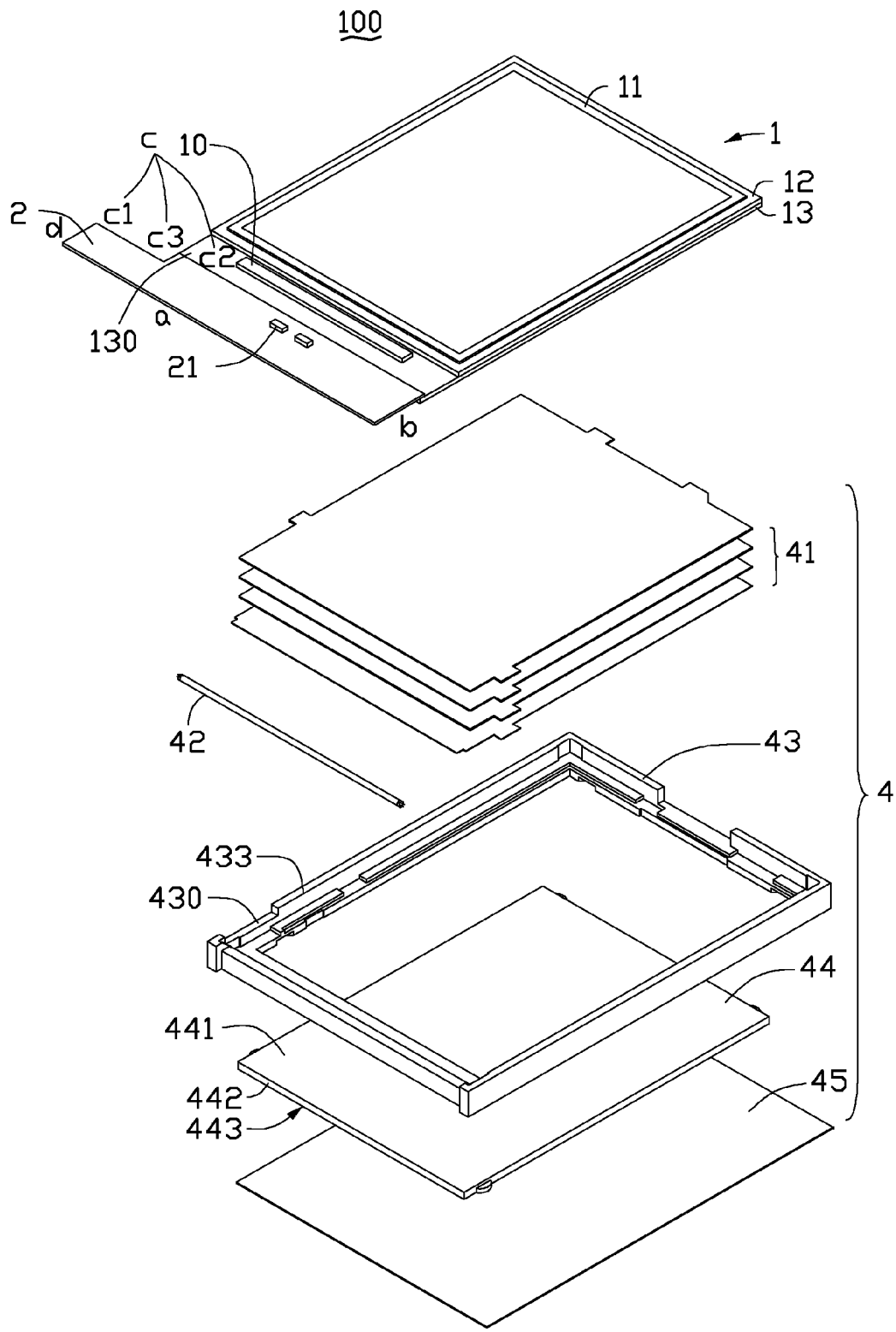
FIG. 1 is an exploded, isometric view of a first embodiment of an LCD device according to the present disclosure.
Figure 2:
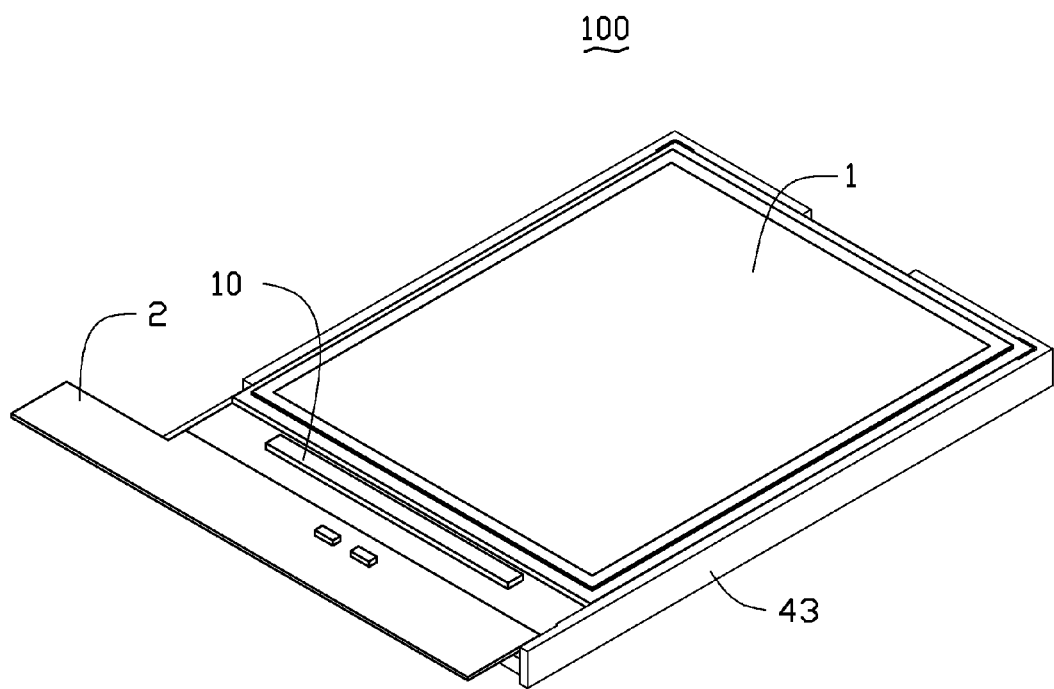
FIG. 2 is a partly assembled view of the LCD device of FIG. 1.
Figure 3:
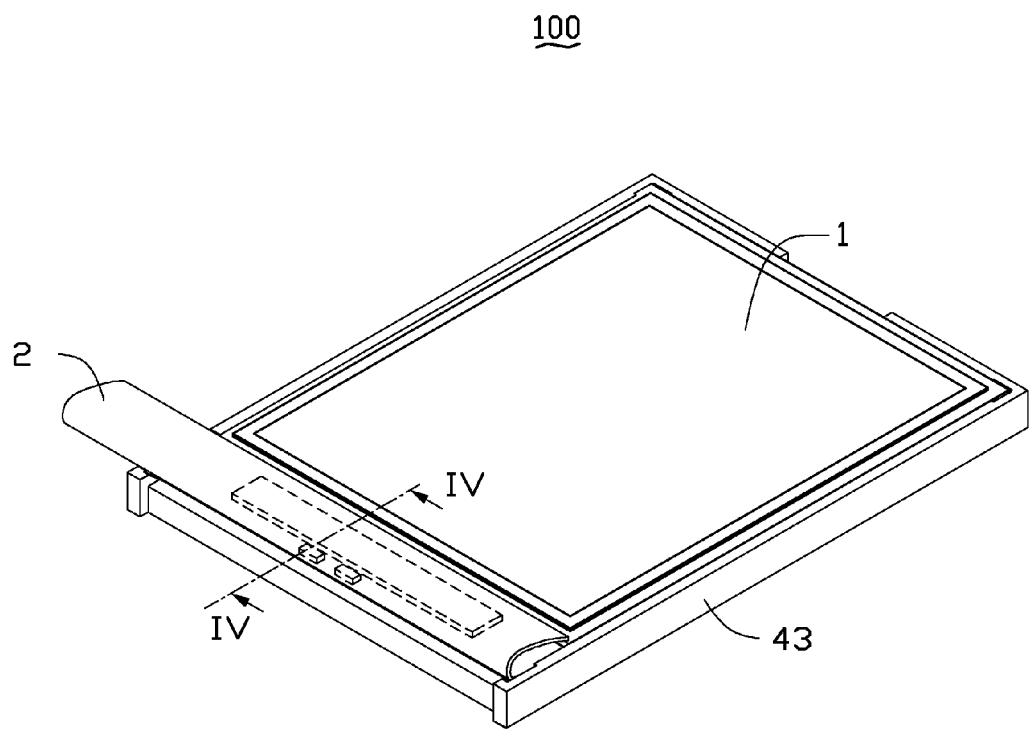
FIG. 3 is a fully assembled view of the LCD device of FIG. 1.
Figure 4:
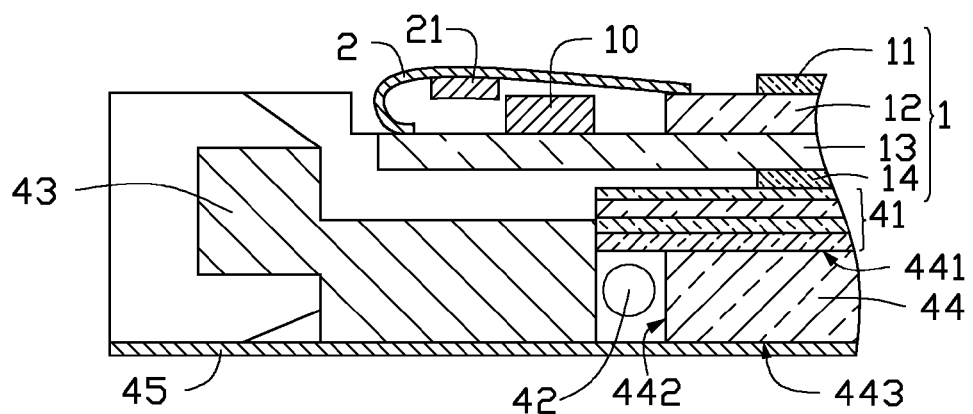
FIG. 4 is an enlarged cross-section of part of the LCD device taken along line IV-IV of FIG. 3.

Reference will now be made to the drawings to describe the present disclosure in detail.

Referring to FIG. 1 to FIG. 4, a first embodiment of an LCD device 100 according to the present disclosure includes an LCD panel 1, a flexible printed circuit (FPC) board 2, and a backlight module 4. The backlight module 4 is located adjacent to the LCD panel 1, supplying illumination thereto. The FPC board 2 is connected to the LCD panel 1, with a fixing end of the FPC board 2 fixed on an edge of the LCD panel 1.

The LCD panel 1 may include a first substrate 12 and a second substrate 13. The first substrate 12 and the second substrate 13 are opposite to each other, and a liquid crystal layer (not shown) is sandwiched therebetween. The second substrate 13 may be a thin film transistor (TFT) substrate, and the first substrate 12 may be a color filter (CF) substrate. The second substrate 13 includes a display region, and a peripheral circuit region disposed adjacent to the display region. In this embodiment, the second substrate 13 is longer than the first substrate 12, such that a portion of the second substrate 13 extends beyond the first substrate 12. The exposed portion of the second substrate 13 forms an extending strip 130. At least part of the peripheral circuit region is located at the extending strip 130. A TFT array may be disposed at the display region, and a controller 10 may be disposed at the peripheral circuit region. The controller 10 is electrically connected to the TFT array of the LCD panel 1 and configured to control the TFT array. The extending strip 130 includes two opposite sides, such as a first side (not labeled) and a second side (not labeled). The first side is adjacent to the display region of the second substrate 13. The second side is a free end of the second substrate 13.

The LCD panel 1 may further include a plurality of optical components. For example, a first polarizer 11 may be disposed over the first substrate 12, and a second polarizer 14 may be disposed beneath the second substrate 13.

The FPC board 2 includes at least two insulating layers (not shown) and a metal layer (not shown). The metal layer is sandwiched between the two insulating layers. The metal layer includes many lines to transmit electrical signals. The FPC board 2 includes a fixing portion (not labeled), a bent portion (not labeled), and a pin portion (not labeled). The fixing portion may be located at an end of the FPC board 2 for fixing the FPC board 2 to the second substrate 13. The fixing portion may be bonded at an edge portion of an upper surface of the extending strip 130. The bent portion is bent toward the display region and covers at least portion of the peripheral circuit region. The controller 10 thus may be covered by the bent portion. The pin portion extends from a lateral side of the bent portion. Some electrical components 21, such as a mini Integrated Circuit and a capacitance, may be mounted at a surface of the FPC at the fixing portion and/or the bent portion, and are accordingly covered by the bent portion.

Specifically, the FPC board 2 may be a flexible board which includes a first side "a", two opposite second sides "b" and "d", and a third side "c" opposite to the first side "a". The second sides "b" and "d" connect to the first side "a". In this embodiment, the second side "d" is shorter than the second side "b", and the pin portion is disposed adjacent to the second side "d". The third side "c" is step shaped. The third side "c" includes a fourth side "c1" and a fifth side "c2" parallel to the first side "a", and a sixth side "c3" perpendicularly connecting the fourth side "c1" and the fifth side "c2". The fourth side "c1" is connected to the second side "d". The fifth side "c2" adheres to the second end of the extending strip 130, and has the same length as the second end of the extending strip 130. The fixing portion is disposed adjacent to the fifth side "c2". The fifth side "c2" is connected to the second sides "b".

When the FPC board 2 is bent, the first side "a" adheres to an end of the first substrate 12 so as to cover the controller 10. The sixth side "c3" is bent. The second side "d" corresponds to a free end of the pin portion, and the pin portion is able to connect with an external circuit and receive and transmit signals from and to the external circuit. The electrical components 21 and the controller 10 are disposed separately and do not influence each other.

The backlight module 4 includes an optical film assembly 41, a light source 42, a frame 43, a light guide plate 44, and a reflector 45. The frame 43 includes four sidewalls (not labeled) connected end to end. One of the four sidewalls 433 includes a notch 430. The width of the notch 430 is greater than or equal to that of the second side "d". The light guide plate 44 includes a top light emitting surface 441, a light incident surface 442 adjacent to the light emitting surface 441, and a bottom surface 443.

The optical film assembly 41, the light source 42, the light guide plate 44, the reflector 45, and the LCD panel 1 are accommodated in the frame 43. The light source 42 is disposed adjacent to a light incident surface 442 of the light guide plate 44. The reflector 45 is disposed adjacent to the bottom surface 443 of the liquid guide plate 44. The optical film assembly 41 is disposed adjacent to the light emitting surface 441 of the light guide plate 44. The LCD panel 1 is disposed adjacent to the optical film assembly 41, and supported by the sidewalls of the frame 43. The pin portion of the FPC board 2 extends out of the frame 43 via the notch 430.

During assembly, the FPC board 2 bends and covers the controller 10. The metal layer of the FPC board 2 shields the surroundings from electromagnetic radiation emanating from controller 10. The FPC board 2 further protects the controller 10 from electromagnetic interference (EMI) generated by other nearby high-speed devices, as well as from static electricity.

Figure 5:
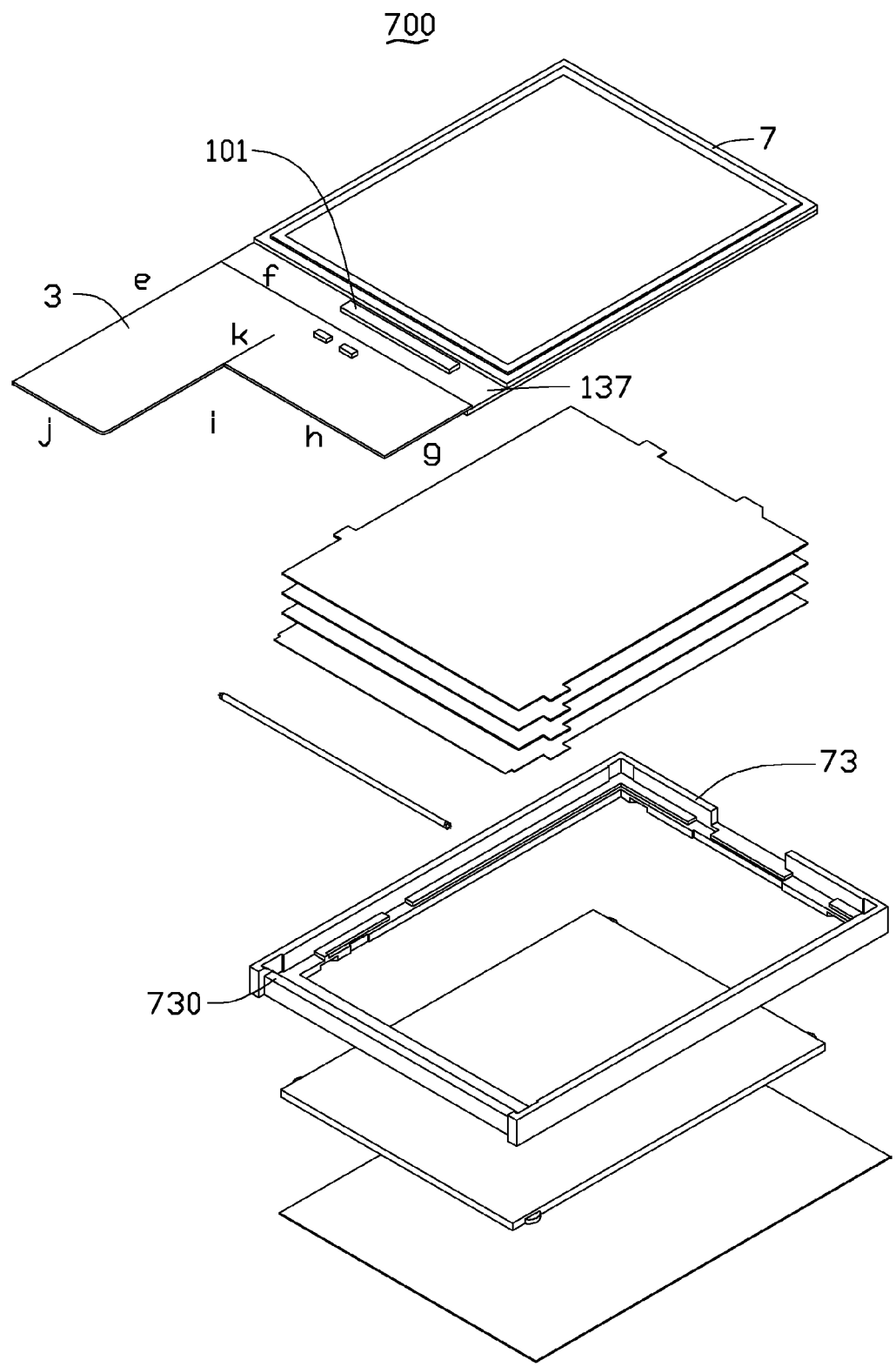
FIG. 5 is an exploded, isometric view of a second embodiment of an LCD device according to the present disclosure.
Figure 6:
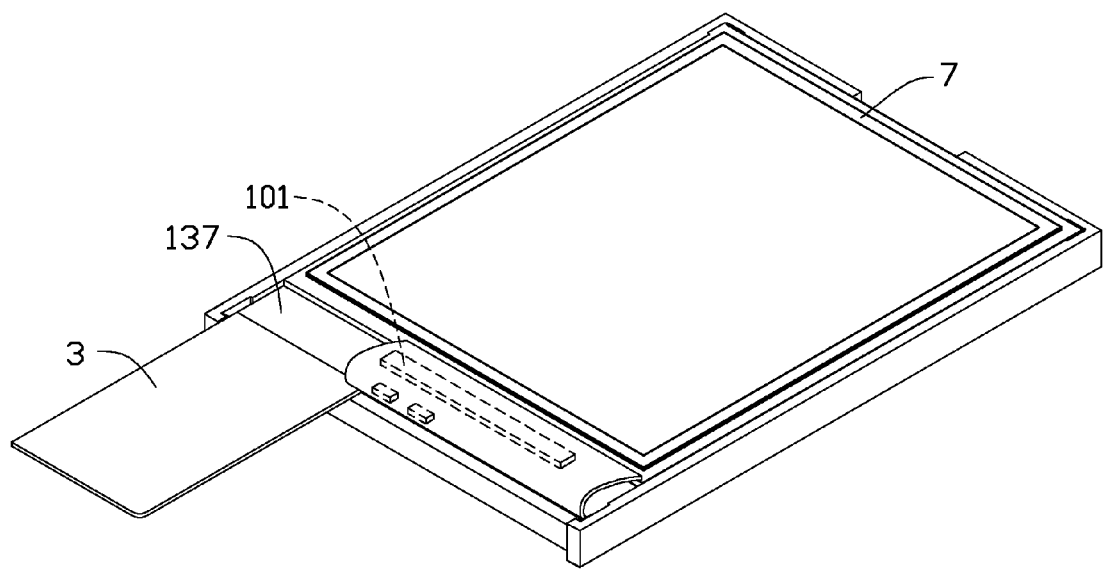
FIG. 6 is a fully assembled view of the LCD device of FIG. 5.

Referring to FIG. 5 to FIG. 6, an LCD device 700 according to a second embodiment is shown, differing from LCD device 100 in that only a portion of a peripheral circuit region of the LCD panel 7 is covered and shielded by an FPC board 3. The FPC board 3 may have an L shape, and when unbent may be formed by sides "e", "f", "g", "h", "i", and "j" connected in that order. The side "e" is parallel to the side "i". The side "f" is parallel to the side "h". The side "j" and side "g" are two ends of the FPC board 3. The length of the side "f" is as same as the length of a second end of an extending portion 137, and a fixing portion of the FPC board 3 is disposed adjacent to the side "f". The side "f" adheres to a second end of the extending portion 137. An incision is formed between the side "i" and the side "h" so that the side "h" can bend up. A pin portion (not labeled) is disposed near the sides of "e", "j", "i", "k", and "f". The bent portion is formed by the part of the sides "k", "h", "g" and "f". The sidewalls of the frame 73 include a sidewall 730. The pin portion extends out of the sidewall 730, to connect with an external circuit and receive and transmit signals from and to the external circuit. The side "h" is bent up to adhere to the extending portion 137, and thereby covers a controller 101.

In other variations of the first embodiment, the first side "a" can adhere to a top surface of the first polarizer 11, and thereby cover the controller 10. Furthermore, the LCD device 100 can also include a metal sheet to cover the controller 10, with the FPC board 2 covering the metal sheet.

It is to be further understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A liquid crystal display device comprising:
   a liquid crystal display (LCD) panel comprising a first substrate and a controller disposed on the first substrate;
   a flexible printed circuit board electrically connected to the liquid crystal display panel; and
   an electrical component mounted on the flexible printed circuit board;
   wherein the controller and the electrical component are both located at the same side of the first substrate, accommodated in a space between the first substrate and the flexible printed circuit board, and is covered by the flexible printed circuit board.

2. The liquid crystal display device of claim 1, wherein the LCD panel comprises a display region and a peripheral circuit region adjacent to the display region, and the controller disposed on the peripheral circuit region.

3. The liquid crystal display device of claim 2, further comprising a second substrate and a liquid crystal layer sandwiched between the first substrate and the second substrate, the first substrate being longer than the second substrate so that a portion of the first substrate is exposed outside of the second substrate and defines an extending strip, and the controller disposed on the extending strip.

4. The liquid crystal display device of claim 3, wherein a thin film transistor (TFT) array is disposed at the display region of the first substrate.

5. The liquid crystal display device of claim 4, wherein the extending strip comprises a first side and a second side opposite to the first side, the first side being adjacent to the display region of the first substrate, the second side being a free end of the first substrate, and the flexible printed circuit board electrically connected to the second side of the extending strip.

6. The liquid crystal display device of claim 5, wherein the flexible printed circuit board comprises a fixing portion and a bent portion, the fixing portion bonded to the second side of the extending strip, and the bent portion covering the controller.

7. The liquid crystal display device of claim 6, wherein the fixing portion is bonded at a surface of the extending strip which faces generally toward the second substrate.

8. The liquid crystal display device of claim 6, wherein the flexible printed circuit board comprises a pin portion configured to connect with an external circuit.

9. The liquid crystal display device of claim 8, wherein the pin portion extends from a lateral side of the bent portion.

10. The liquid crystal display device of claim 8, wherein an incision is defined between the bent portion and the pin portion, the incision enabling the bent portion to be bent relative to the pin portion.

11. The liquid crystal display device of claim 1, wherein the flexible printed circuit board comprises at least two insulating layers and a metal layer sandwiched between the two insulating layers.

12. The liquid crystal display device of claim 1, wherein the flexible printed circuit board electrically connects the controller.

13. A liquid crystal display device comprising:
   a liquid crystal display panel comprising a controller, the controller configured for driving the liquid crystal display panel;
   a flexible printed circuit board comprising a metal layer; and
   an electrical component mounted on the flexible printed circuit board;
   wherein the metal layer of the circuit board covers and shields the controller, and the controller and the electrical component both are located on the same side of the liquid crystal display panel and accommodated in a space between the liquid crystal panel and the flexible printed circuit board.

14. The liquid crystal display device of claim 13, wherein the liquid crystal display panel comprises a display region and a peripheral circuit region adjacent to the display region, and the controller disposed on the peripheral circuit region.

15. The liquid crystal display device of claim 14, further comprising a first substrate, a second substrate and liquid crystal layer sandwiched between the first substrate and the second substrate, the second substrate being longer than the first substrate, so that a portion of the second substrate is exposed outside of the first substrate and defines an extending strip, and the controller disposed on the extending strip.

16. The liquid crystal display device of claim 15, wherein a thin film transistor (TFT) is disposed at the display region of the second substrate.

17. A liquid crystal display device panel comprising:
- a flexible printed circuit board comprising a metal layer; and
- a thin film transistor (TFT) substrate comprising a controller; and
- an electrical component mounted on the flexible printed circuit board;
- wherein the TFT substrate comprises a display region and a peripheral circuit region adjacent to the display region, the controller is disposed on the peripheral circuit region, and the electrical component and the controller are both located on the same side of the TFT substrate, accommodated in a space between the TFT substrate and the flexible printed circuit board, and shielded by the metal layer of the flexible printed circuit board.

18. The liquid crystal display device panel of claim 17, the TFT substrate being longer than that of the color filter substrate, so that a portion of the TFT substrate is exposed outside of the color filter substrate and defines an extending strip, and the controller disposed on the extending strip.

19. The liquid crystal display device panel of claim 18, wherein the controller and the electrical component are covered by the flexible printed circuit board.

20. The liquid crystal display device panel of claim 17, wherein the flexible printed circuit board electrically connects the controller.

* * * * *